United States Patent
Hendrix et al.

(10) Patent No.: US 10,214,394 B2
(45) Date of Patent: Feb. 26, 2019

(54) HOOK WITH LATCH AND TRIGGER MECHANISM ASSEMBLY

(71) Applicant: The Crosby Group LLC, Tulsa, OK (US)

(72) Inventors: Floyd Hendrix, Tulsa, OK (US); Roger Ohman, III, Broken Arrow, OK (US); Roger Beall, Mounds, OK (US)

(73) Assignee: The Crosby Group LLC, Tulsa, OK (US)

( * ) Notice: Subject to any disclaimer, the term of this patent is extended or adjusted under 35 U.S.C. 154(b) by 258 days.

(21) Appl. No.: 15/184,586

(22) Filed: Jun. 16, 2016

(65) Prior Publication Data

US 2016/0376129 A1 Dec. 29, 2016

Related U.S. Application Data

(60) Provisional application No. 62/180,384, filed on Jun. 16, 2015.

(51) Int. Cl.
*B66C 1/36* (2006.01)
*F16B 45/02* (2006.01)

(52) U.S. Cl.
CPC ............... *B66C 1/36* (2013.01); *F16B 45/02* (2013.01)

(58) Field of Classification Search
CPC ... B66C 1/36; B66C 1/34; F16B 45/02; E21B 19/04
USPC ............ 294/82.2, 82.16, 82.17, 82.34, 82.33
See application file for complete search history.

(56) References Cited

U.S. PATENT DOCUMENTS

| 1,541,991 | A | * | 6/1925 | Moody | E21B 19/04 24/599.7 |
| 1,546,208 | A | * | 7/1925 | Cunningham | E21B 19/04 24/599.5 |
| 1,554,303 | A | * | 9/1925 | Smith | E21B 19/04 24/600.1 |
| 1,687,006 | A | * | 10/1928 | Cornelius | E21B 19/04 24/598.9 |
| 1,711,440 | A | * | 4/1929 | Baker | E21B 19/04 24/600.7 |
| 2,027,376 | A | * | 1/1936 | Grau | E21B 19/04 294/82.2 |

(Continued)

FOREIGN PATENT DOCUMENTS

| AU | 2006201627 | 11/2006 |
| AU | 2009207446 | 5/2015 |

(Continued)

OTHER PUBLICATIONS

Crosby SHUR-LOC Hooks; Specification Sheet; p. 94 Copyright 2005 The Crosby Group, Inc. All Rights Reserved.
(Continued)

*Primary Examiner* — Gabriela M Puig
(74) *Attorney, Agent, or Firm* — Head, Johnson, Kachigian & Wilkinson, PC

(57) ABSTRACT

A hook with a latch and trigger mechanism assembly. The assembly includes a hook having a body and an open saddle. A latch is pivotable between a closed position and an open position. A finger handle extends from the body. A finger trigger entirely within a space between the finger handle and the body is movable between a closed rest position and a retracted position permitting movement of the latch to the open position.

2 Claims, 14 Drawing Sheets

(56) References Cited

U.S. PATENT DOCUMENTS

| | | | | |
|---|---|---|---|---|
| 3,722,943 A | * | 3/1973 | Kalua, Jr. | B66C 1/36 294/82.2 |
| 3,940,173 A | | 2/1976 | Ulbing | |
| 4,122,585 A | * | 10/1978 | Sharp | B66C 1/36 24/599.5 |
| 4,293,156 A | * | 10/1981 | Chapalain | B66C 1/36 24/600.2 |
| 4,309,052 A | | 1/1982 | Drayton | |
| 5,103,755 A | | 4/1992 | Garrett | |
| 5,193,480 A | | 3/1993 | Garrett | |
| 5,416,955 A | * | 5/1995 | Katsma | F16B 45/02 24/588.1 |
| 5,634,246 A | * | 6/1997 | Jermyn, Jr. | F16B 45/02 24/265 H |
| 5,687,931 A | * | 11/1997 | Hogan | B64D 17/38 244/151 B |
| 8,240,727 B2 | | 8/2012 | Toon | |
| 2010/0289284 A1 | * | 11/2010 | Toon | B66C 1/36 294/82.19 |
| 2011/0042984 A1 | * | 2/2011 | Rocourt | A62B 35/0081 294/82.33 |
| 2011/0175385 A1 | | 7/2011 | Buie et al. | |
| 2012/0091743 A1 | * | 4/2012 | Ohman, III | B66C 1/44 294/104 |

FOREIGN PATENT DOCUMENTS

| | | | | |
|---|---|---|---|---|
| CA | 2963937 A1 | * | 4/2016 | ......... A62B 35/0037 |
| CN | 201169489 | | 12/2008 | |
| EP | 2231497 | | 9/2014 | |
| FR | 2432471 | | 2/1980 | |
| FR | 2432471 A1 | * | 2/1980 | ............... B66C 1/36 |
| GB | 1430543 | | 6/1973 | |
| GB | 2009050057 | | 1/2008 | |
| WO | WO2007071896 | | 6/2007 | |
| WO | WO2009093074 | | 7/2009 | |

OTHER PUBLICATIONS

Crosby Forged Hooks; Specification Sheet; p. 103 Copyright 2002 The Crosby Group, Inc. All Rights Reserved.
Chain Slings ACCO Catalog RK 93 Bulletin 1000; SP93-023 CON 20M 0593 Printed in U.S.A.
ACCO Chain and Accessories ACCO Chain & Lifting Products Division; 76 Acco Drive, Box 792, York, PA 17405-0792; Bulletin 0575; SP95-027 CON 25M 0296 Printed in U.S.A.
Crosby Innovation SHUR-LOC Hooks with Recessed Trigger The Crosby Group, Inc. STK#9999318; PPG 2.5M Dec. 2005.
Premiere Stampings Design Parsons Chain Co.

* cited by examiner

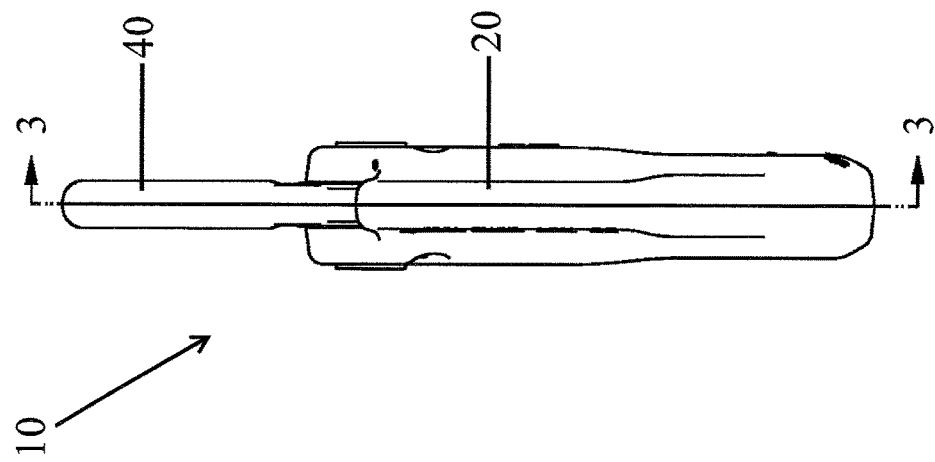
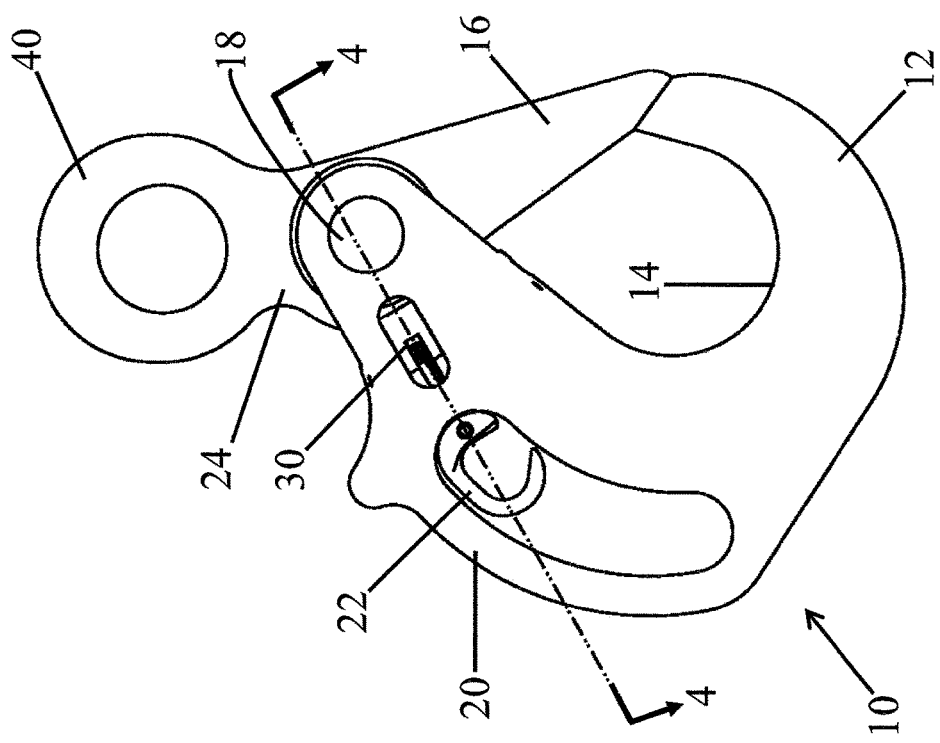

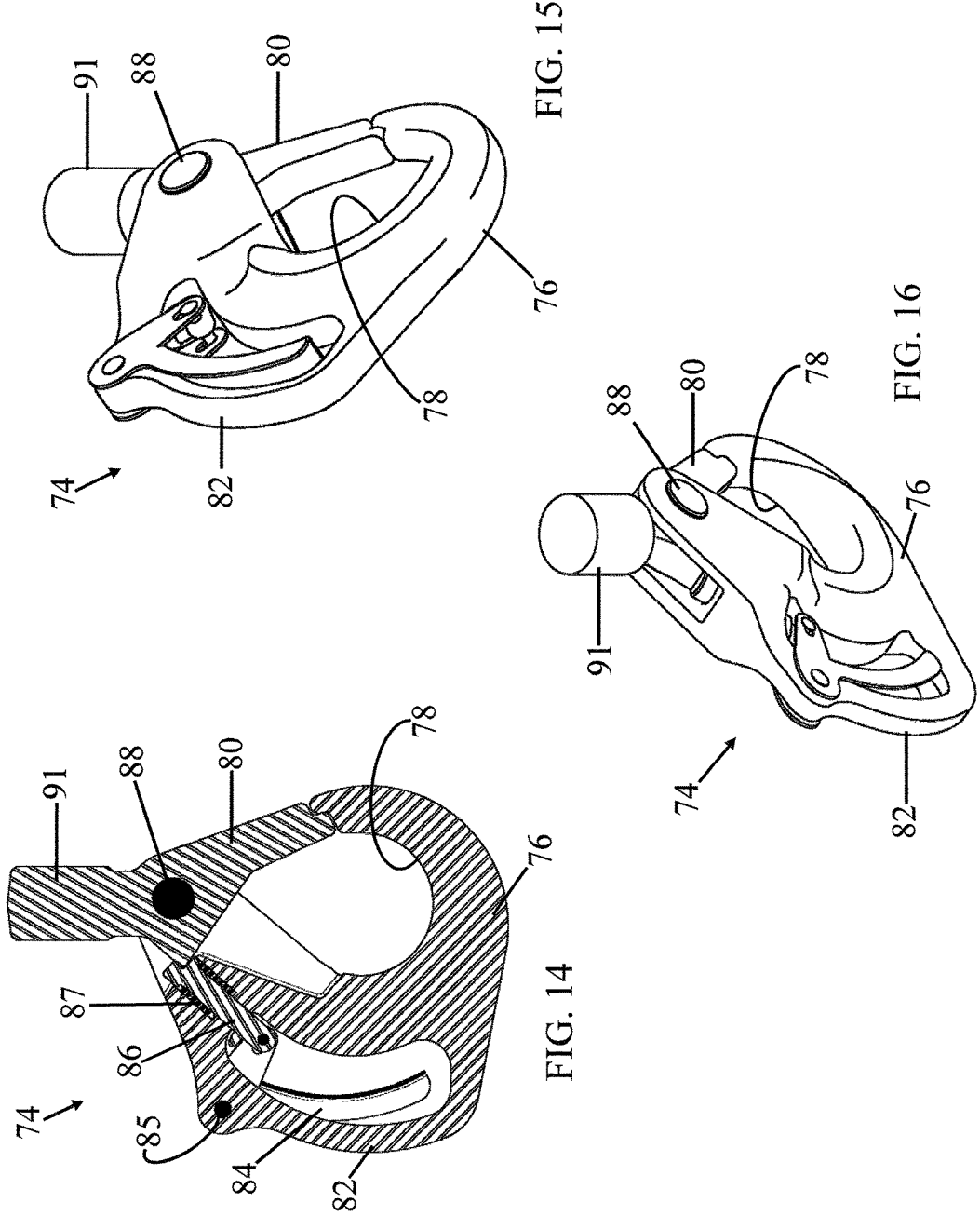

HOOK WITH LATCH AND TRIGGER MECHANISM ASSEMBLY

CROSS-REFERENCE TO RELATED APPLICATIONS

This application claims priority to and the benefit of U.S. Provisional Patent Application Ser. No. 62/180,384, filed Jun. 16, 2015, which is herein incorporated in its entirety by reference.

BACKGROUND OF THE INVENTION

1. Field of the Invention

The present invention relates to a hook for lifting loads with a locking latch having a trigger mechanism for disengaging the lock in order to move the latch from a closed to an open position.

2. Prior Art

Various types of industrial hooks are utilized for lifting large loads. The hook assembly will typically have a body with an open saddle for receiving a load or rigging for the load. In some cases, the hook assembly includes a latch for closing the saddle of the hook so that the load or rigging cannot be dislodged or removed from the hook unless the latch is moved to an open position.

The body of the hook, in turn, will be connected to rigging, such as a wire line to raise the load. The hook may feature an eye, a clevis, a swivel or other attachment mechanism.

For example, Applicant manufactures and markets a line of hooks under the SHUR-LOC brand that feature self-locking latches.

Various types of handles have been added to the body of the hook either as a separate, add-on device or as a part of the body of the hook. In some cases, a finger or thumb moves a button or switch outside of the handle to activate or deactivate the lock.

Notwithstanding the foregoing, there remains a need to provide a hook with a locking latch wherein the trigger mechanism is entirely within the handle.

Furthermore, there remains a need to provide a hook with a locking latch which will only be unlocked by retraction of a finger trigger.

BRIEF DESCRIPTION OF THE DRAWINGS

FIG. 1 illustrates a side view and FIG. 2 illustrates a rear view of a first preferred embodiment of a hook with latch and trigger mechanism assembly constructed in accordance with the present invention;

FIGS. 12 through 16 illustrate a third preferred embodiment of the present invention;

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Figure 4:
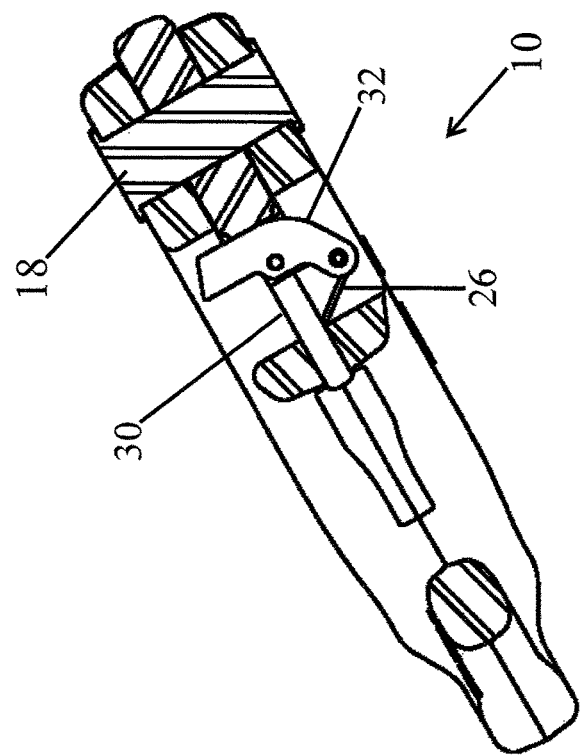
FIG. 4 illustrates a sectional view taken along section line 4-4 of FIG. 2.
Figure 3:
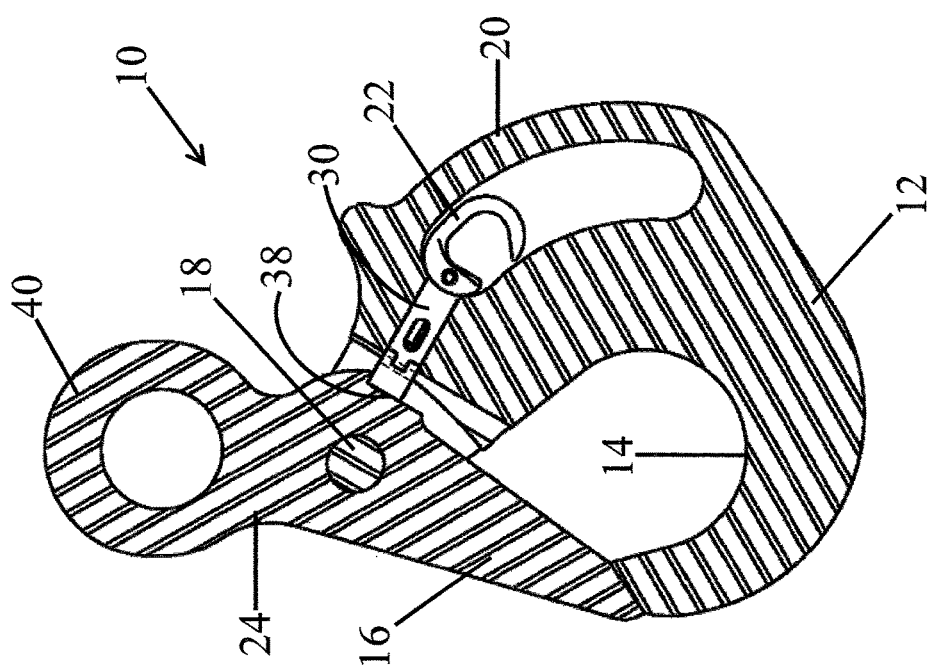
FIG. 3 illustrates a sectional view taken along section line 3-3 of FIG. 1.

Referring to the drawings in detail, FIG. 1 illustrates a side view while FIG. 2 illustrates a rear view of a first preferred embodiment of a hook with latch and trigger mechanism assembly 10. FIG. 3 illustrates a sectional view taken along section line 3-3 of FIG. 2, while FIG. 4 illustrates a sectional view taken along section line 4-4 of FIG. 1. The assembly 10 includes a body 12 and a saddle 14 for receipt of a load or rigging for the load (not shown).

The assembly 10 also includes a latch 16, which is pivotable about a pivot axis 18. The latch 16 is shown in the closed position in FIGS. 1 through 4. When the latch is in the open position (not shown), a load or rigging may be inserted or removed.

The assembly 10 also includes a finger handle 20 which extends from and is integral with the body 12. A retractable finger trigger 22 is located entirely within a space formed between the finger handle 20 and the body 12.

In the present embodiment, the latch 16 is integral with a shank 24 although other arrangements are possible within the spirit and scope of the invention.

The finger trigger 22 is movable between a normal rest position shown in FIGS. 1 through 4 and a retracted position (not shown). The retracted position permits movement of the latch 16 from a closed to an open position. As can be appreciated, the finger trigger 22 can be operated without moving any of the fingers or the hand from the handle 20 and without moving any finger outside of the handle 20.

The finger trigger 22 is pivotally connected to an elongated activating or pull connector pin 30 at one end of the pin by a pull pin 28. The opposite end of the elongated activating pin 30 engages a trigger wedge lock 32.

Figure 5:
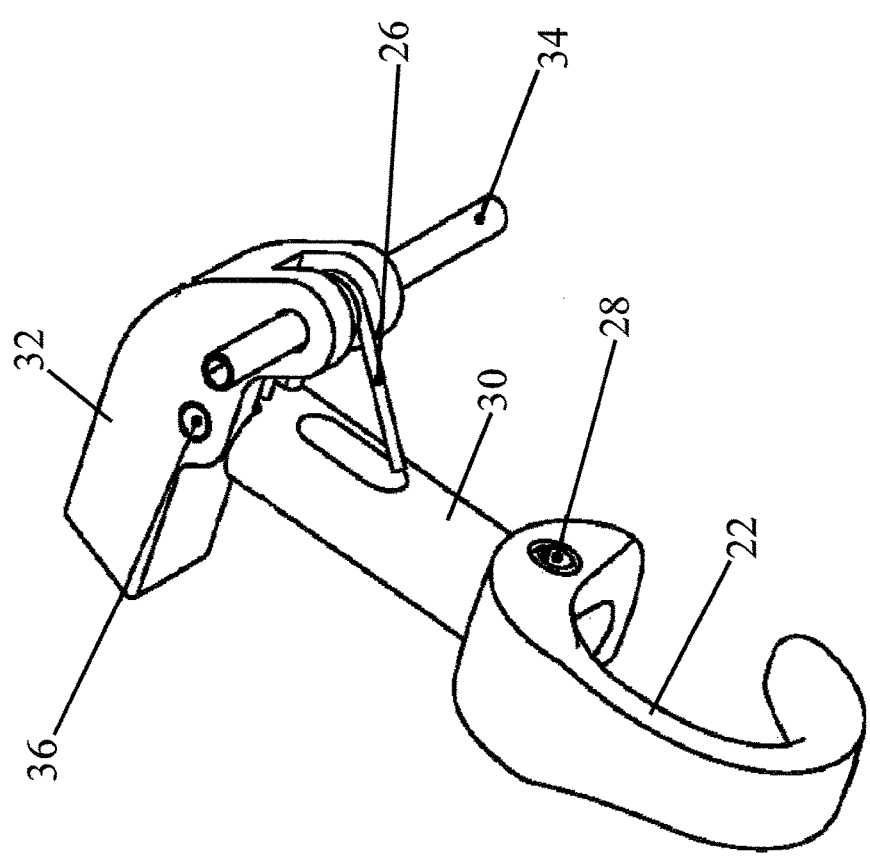
FIG. 5 illustrates a perspective view of the latch and trigger mechanism apart from the assembly.
Figure 6:
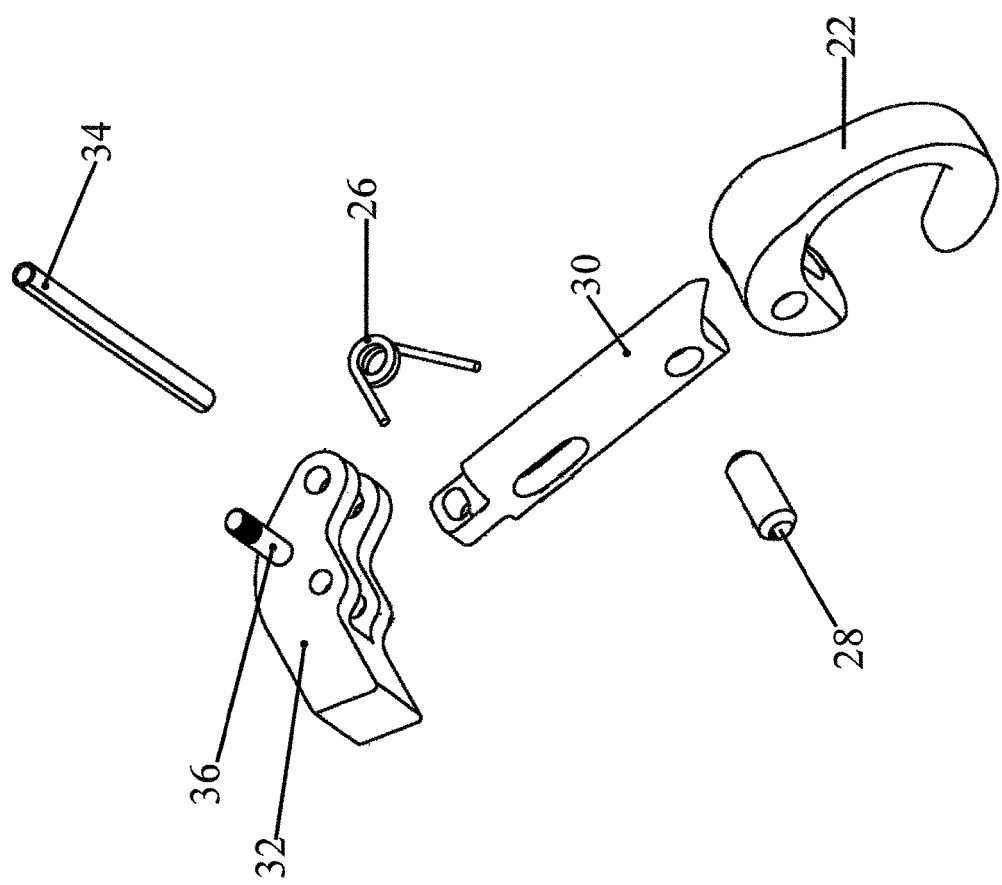
FIG. 6 illustrates an exploded view of the latch and trigger mechanism shown in FIG. 5.

FIG. 5 illustrates a perspective view of the latch locking and trigger mechanism apart from the assembly 10 as a whole. FIG. 6 illustrates an exploded view of the latch locking and trigger mechanism shown in FIG. 5.

The wedge lock 32 is pivotally connected to the activating pin 30 by a connector pin 36. One end of the wedge lock 32 rotates about a trigger pin 34 which is held in place in the body 12 (not seen in FIG. 5 or 6). The opposed end of the wedge lock 32 is received in a recess 38 in the latch 16 (visible in FIG. 3) in order to retain the latch 16 in the closed and locked position.

A torsion spring 26 surrounds the trigger pin 34 and urges the wedge lock 32 into the recess 38 in the latch 16. When the finger trigger 22 is retracted, the elongated activating pin 30 is likewise retracted, causing the wedge lock 32 to become disengaged from recess 38 of the latch 16. Accordingly, when the finger trigger 22 is retracted, the latch 16 may be manually opened with respect to the body 12. Conversely, when the finger trigger 22 is returned to the normal rest position by force of the spring 26, the wedge lock 32 engages the recess in the latch 16.

Returning to a consideration of FIGS. 1, 2 and 3, the shank 24 may terminate in an eye 40 in order to connect to other connectors or lifting equipment (not shown). Alternatively, the shank 24 may be connected to other known elements, such as a stationary eye, shank, clevis or rotating bail.

FIGS. 7 through 11 illustrate a second preferred embodiment of a hook with latch and trigger mechanism assembly 50 of the present invention.

Figure 8:
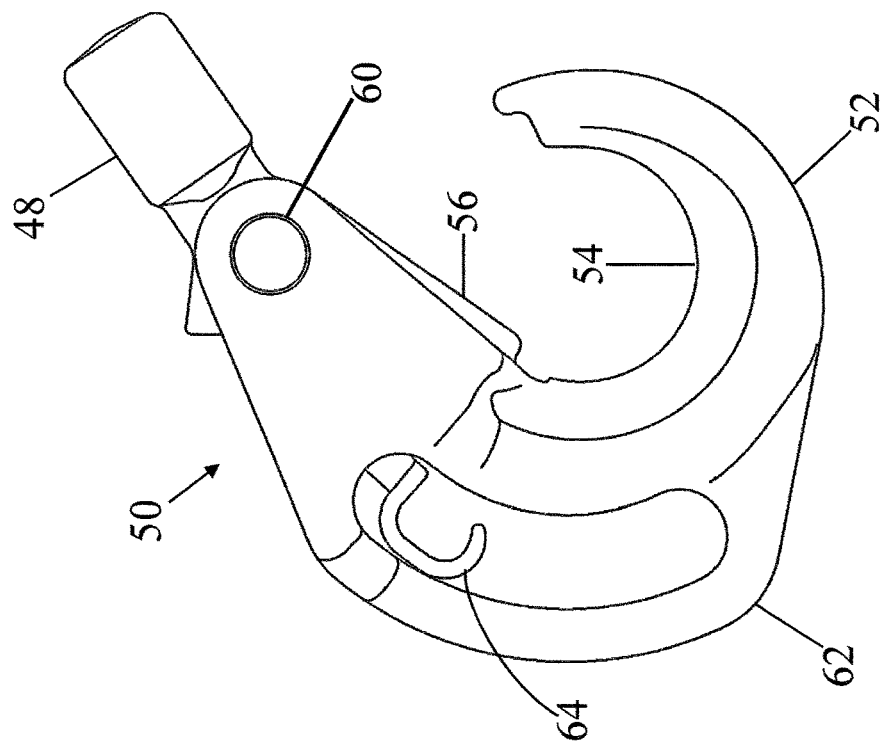
FIGS. 7 through 11 illustrate a second preferred embodiment of the present invention.
Figure 7:
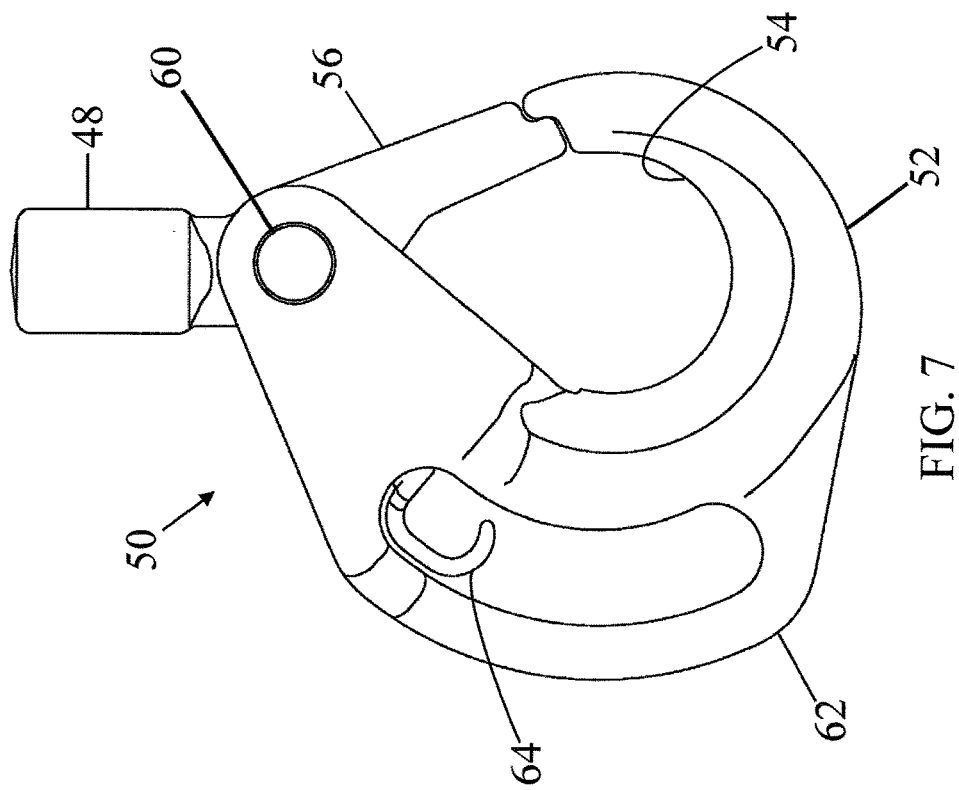
Figure 9:
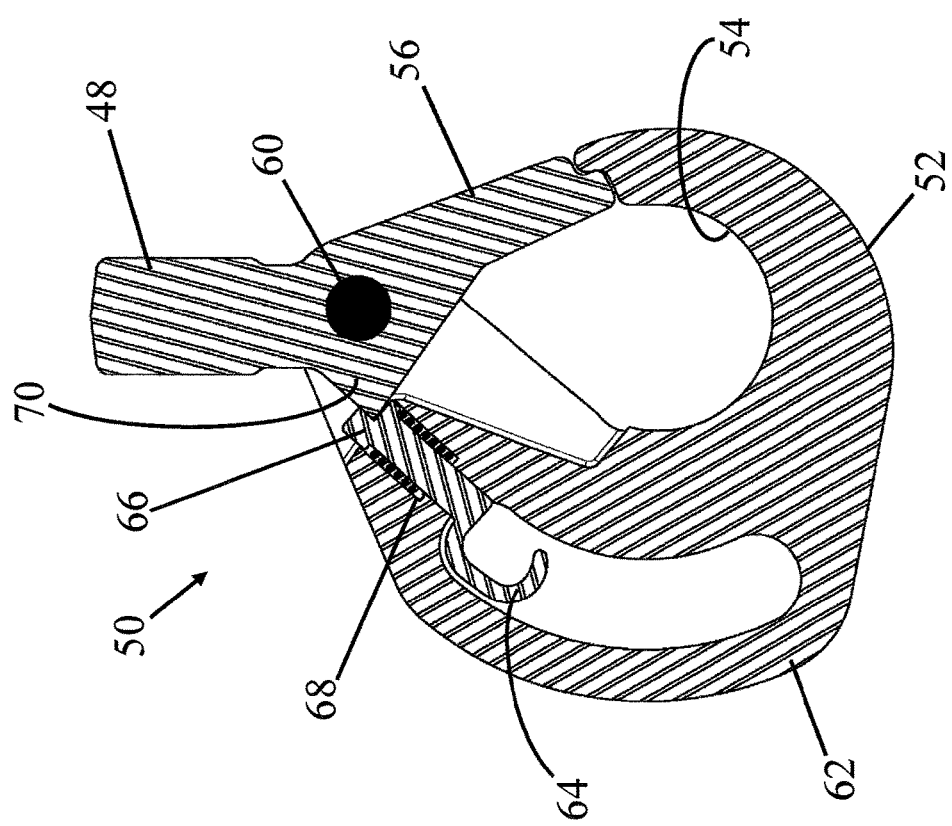
Figure 11:
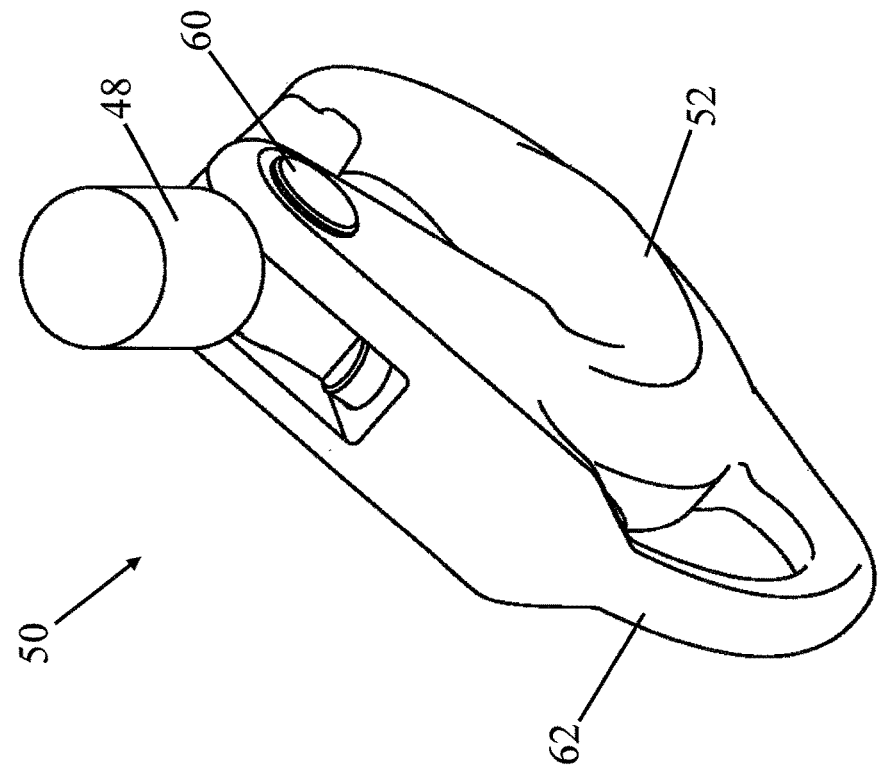
Figure 10:
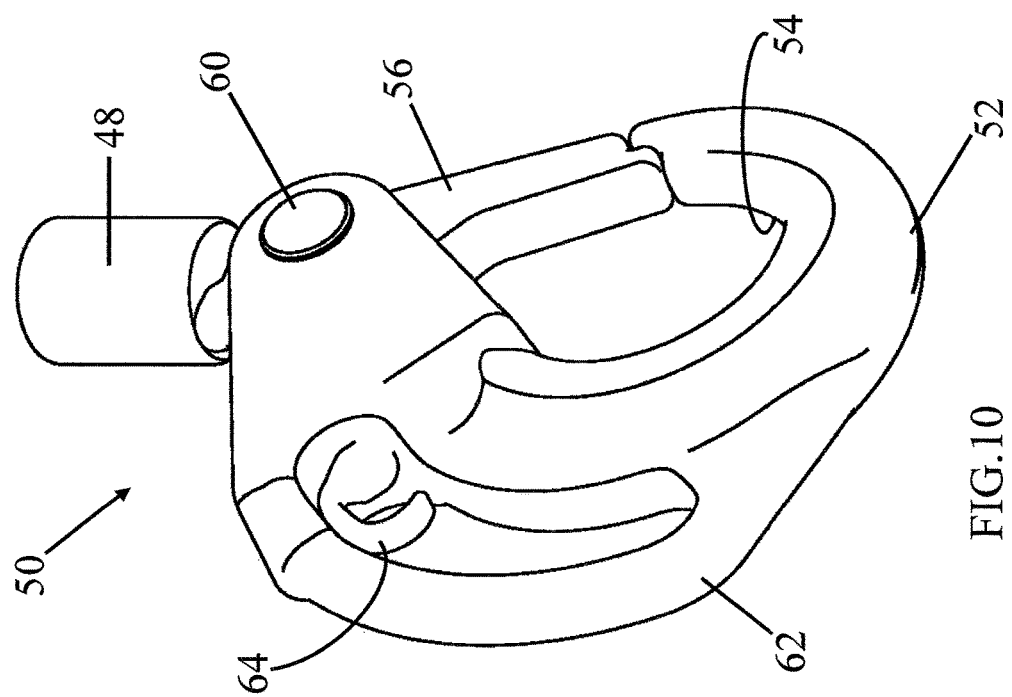

FIG. 7 illustrates a side view of the assembly 50 with a latch 56 in a closed position. FIG. 8 illustrates the assembly 50 with the latch 56 in an open position. FIG. 9 illustrates a sectional view of the assembly 50 in FIG. 7. FIGS. 10 and 11 illustrate alternate perspective views of the assembly 50.

The assembly 50 includes a body 52 and a saddle 54 for receiving a load or rigging for a load (not shown). The latch 56 is urged to a closed position shown in FIG. 7 by placing a load in a saddle 54 which causes the body 52 to rotate about the pivot pin 60 until it engages the latch 56. The latch 56 moves to an open position by moving in toward the saddle 54, however, other arrangements are possible within the spirit and scope of the invention.

A finger handle 62 extends from and is integral with the body 52. A retractable finger trigger 64 is located entirely within a space formed by the finger handle and body.

The retractable finger trigger 64 is connected to one end of an elongated pin 66 (seen in FIG. 9), which is received through an opening in the body 52. A compression spring 68 surrounds the elongated pin 66 in order to urge the retractable trigger 64 toward the rest position so that the latch 56 is in closed position. The opposed end of the pin 66 will rest against a shoulder 70 of the latch 56. When the pin 66 is in the rest position as seen in FIGS. 7 and 9, movement of the latch 56 from the closed position is prevented. When the finger trigger 64 is retracted, as shown in FIG. 8, the pin 66 is retracted and the latch 56 can be manually rotated to the open position.

The finger trigger 64 can be operated without moving any of the fingers or the hand of the operator from the handle 62 and without moving any finger outside of the handle 62.

A shank 48 may terminate in an eye, clevis or other termination (not shown) in order to connect with other connectors of lifting equipment.

Figure 13:
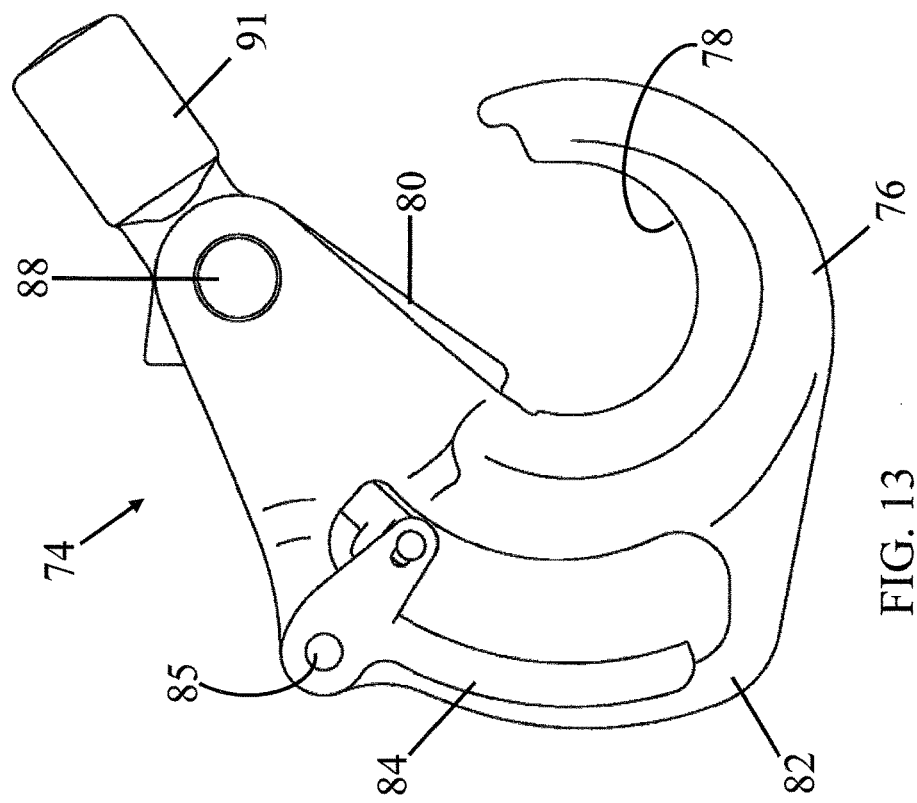
Figure 12:
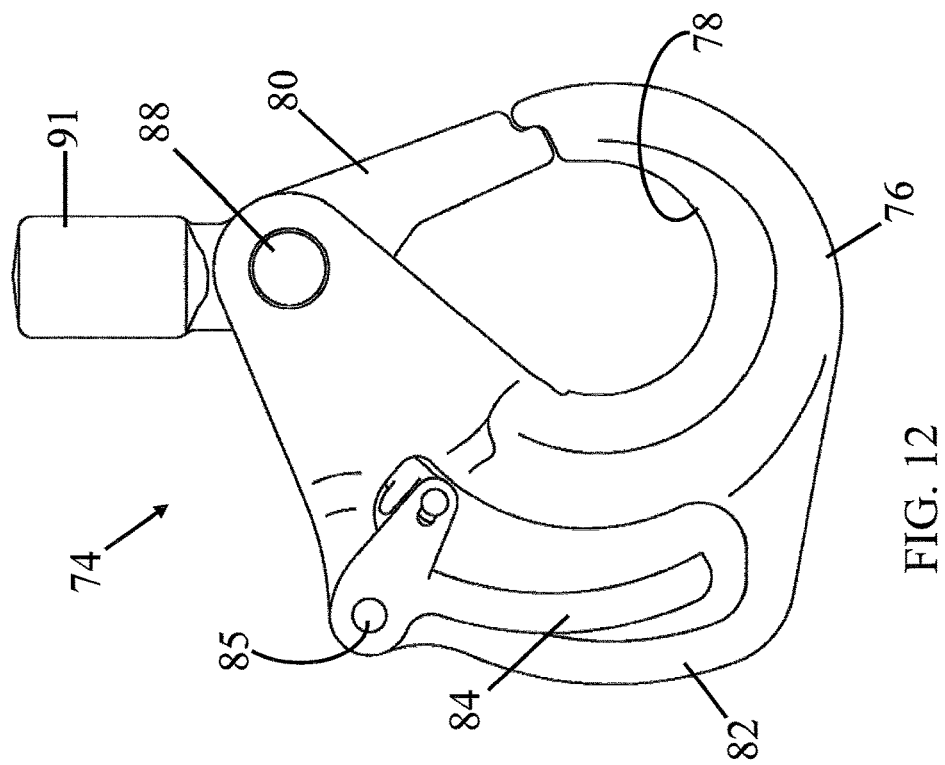

FIGS. 12 through 16 illustrate a third preferred embodiment of a hook with latch and trigger mechanism assembly 74. FIG. 12 illustrates a side view of the assembly 74 with a latch 80 in a closed position. FIG. 13 illustrates a side view of the assembly 74 with the latch 80 in an open position. FIG. 14 illustrates a sectional view through the assembly 74 shown in FIG. 12. FIGS. 15 and 16 illustrate alternate perspective views of the assembly 74.

The assembly 74 includes a body 76 and a saddle 78 for receiving a load or rigging. The latch 80 rotates about a pivot 88 and moves between a closed position shown in FIG. 12 and an open position shown in FIG. 13. The pivot 88 acts as an axis for rotation of the latch 80.

A finger handle 82 extends from and is integral with the body 76.

A paddle trigger 84 is located entirely within a space formed by the handle 82 and the body 76. The paddle trigger 84 is pivotally connected to the handle 82 at axis 85 so that movement of the paddle trigger 84 moves an elongated activating pin 86. A compression spring 87 surrounds the elongated activating pin 86 to urge the pin to engage a shoulder in the latch 80.

The paddle trigger 84 can be operated without moving any of the fingers or the hand of the operator from the handle 82 or without moving any of the fingers outside of the handle 82.

A shank 91 may terminate in an eye, clevis or other termination (not shown) in order to connect with other connectors of lifting equipment.

Figure 17:
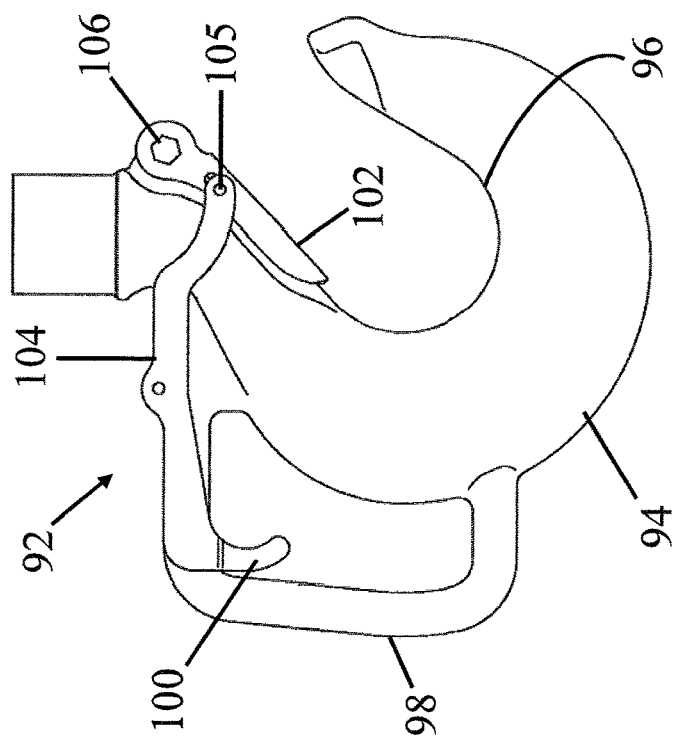
FIGS. 17 through 20 illustrate a fourth preferred embodiment of the present invention.
Figure 18:
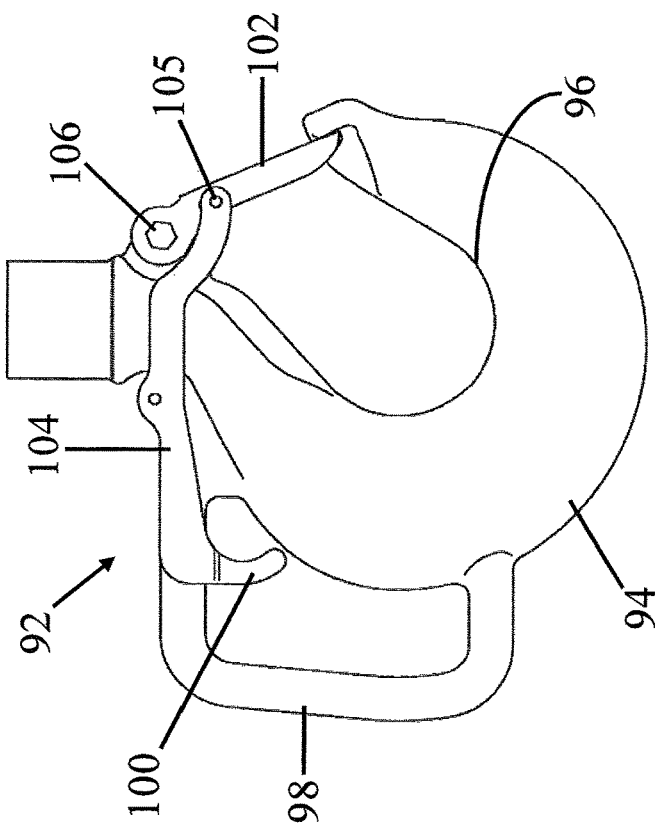
Figure 20:
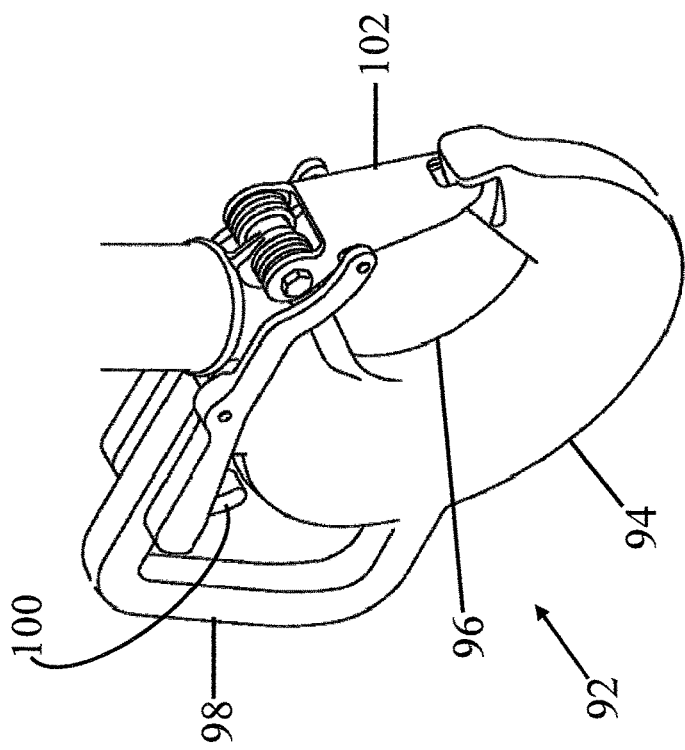
Figure 19:
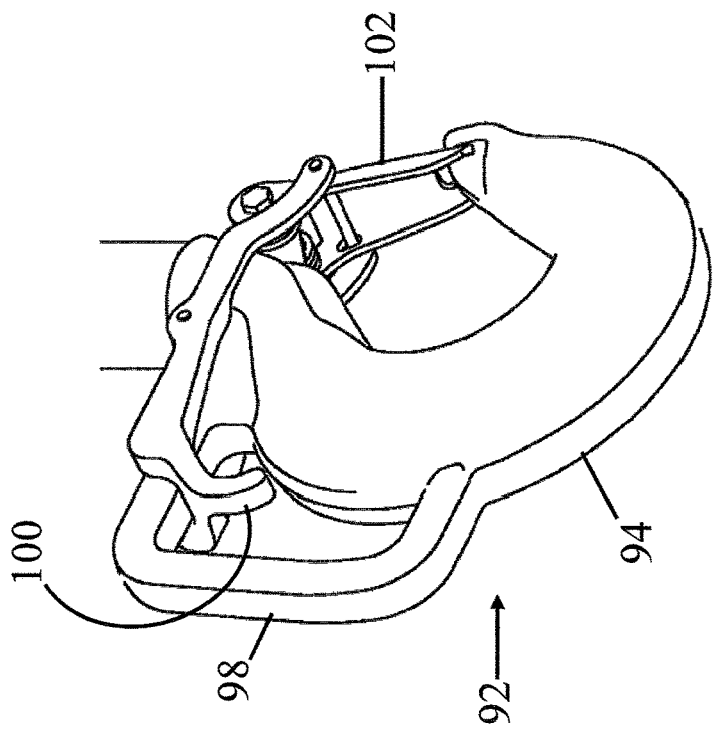

FIGS. 17 through 20 illustrate a fourth preferred embodiment of a hook with latch and trigger mechanism assembly 92. FIG. 17 illustrates a side view of the assembly 92 with a latch 102 in a closed position. FIG. 18 illustrates a side view of the assembly 92 with the latch 102 in an open position. FIGS. 19 and 20 illustrate alternate perspective views of the assembly 92.

The assembly 92 includes a body 94 and a saddle 96 for receipt of a load or rigging for a load (not shown). The latch 102 rotates about a pivot 106 between a closed position shown in FIG. 17 and an open position shown in FIG. 18.

A finger handle 98 extends from and is integral with the body 94. A trigger 100 is located entirely within a space formed by the finger handle 98 and the body 94.

The finger trigger 100 has a slide extension 104 for pivotal connection at connector 105 to the latch 102 for movement of the latch 102 between a closed position shown in FIG. 17 and an open position shown in FIG. 18.

Retraction of the finger trigger 100 moves the slide extension 104 which moves the latch 102 to an open position. The finger trigger 100 can be operated without moving any of the fingers or the hand of the operator from the handle 98 or without moving any of the fingers outside of the handle.

Figure 22:
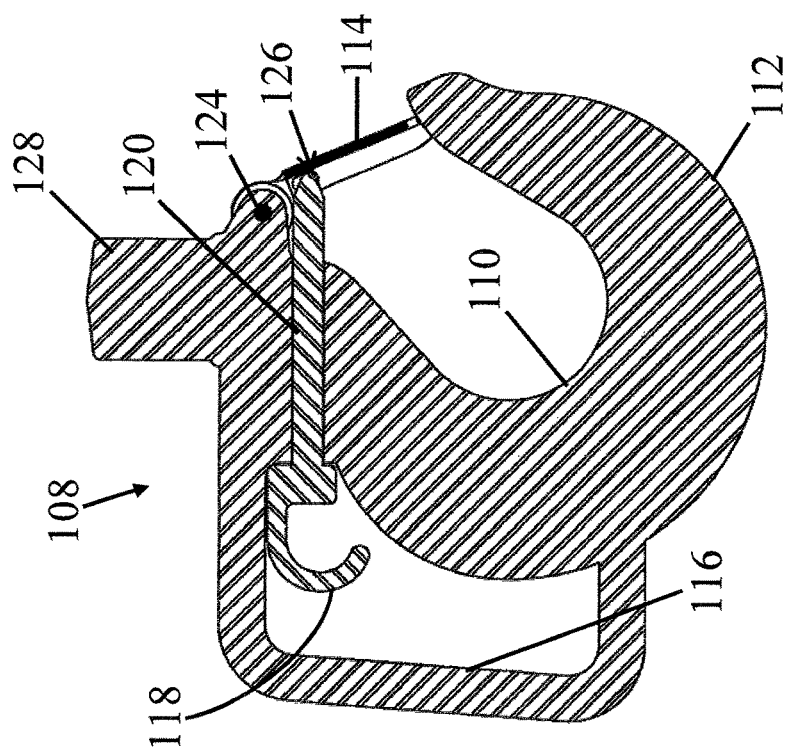
FIGS. 21 through 26 illustrate a fifth preferred embodiment of the present invention.
Figure 21:
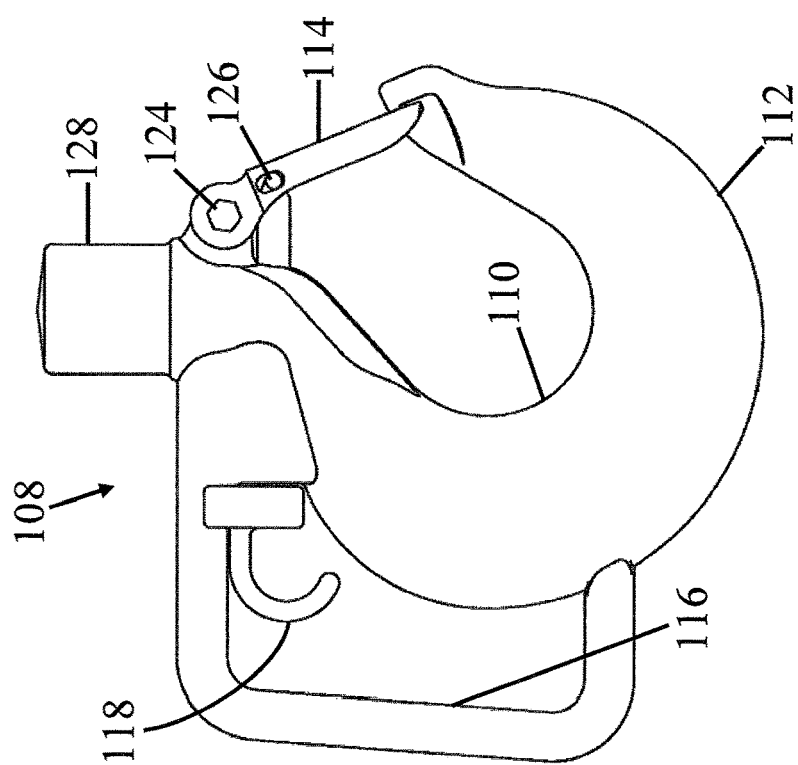
Figure 24:
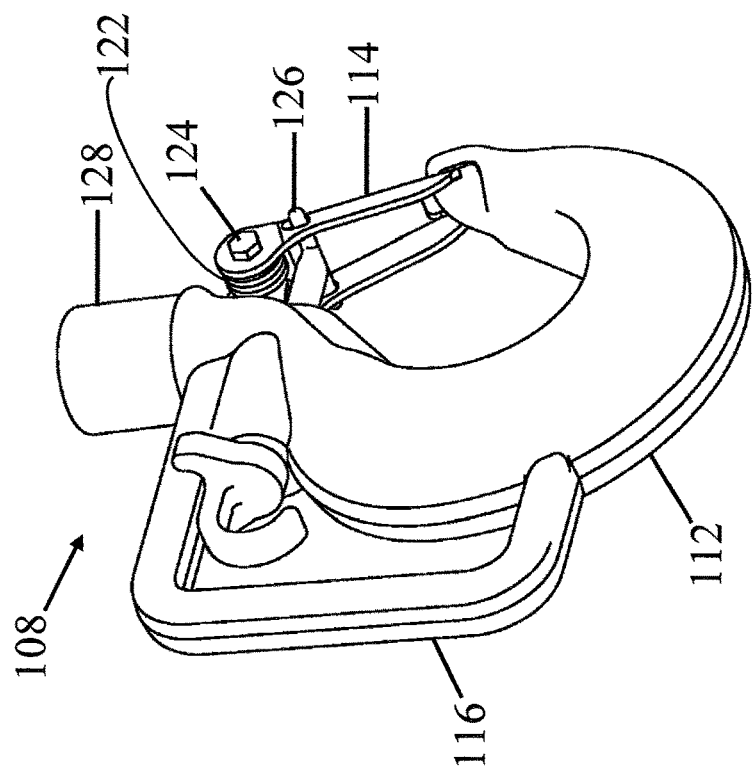
Figure 23:
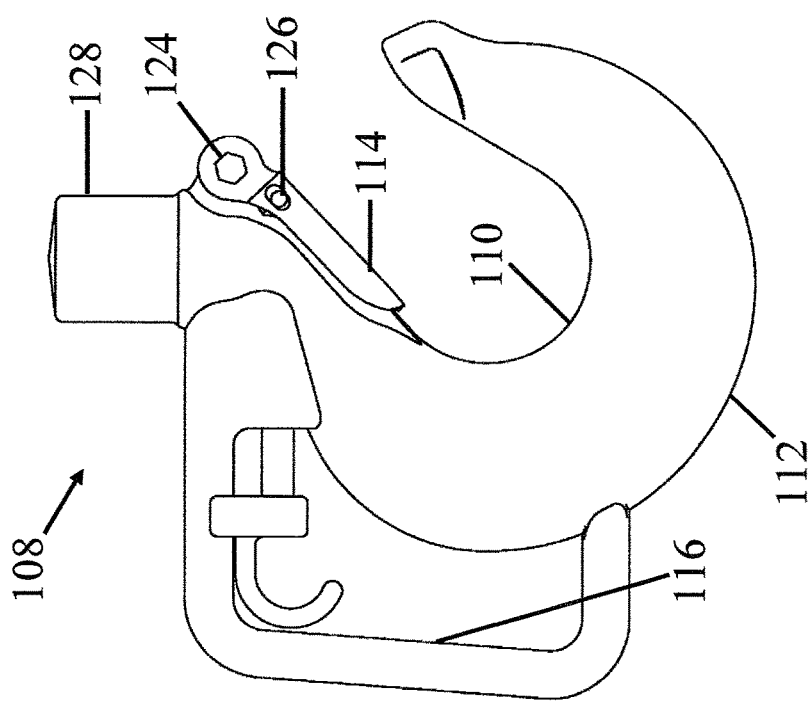
Figure 26:
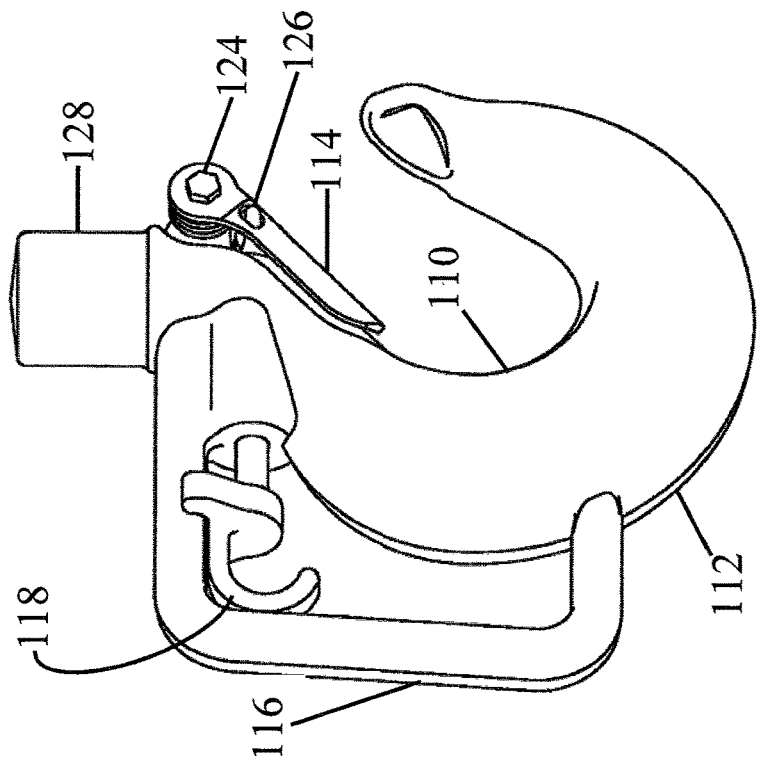
Figure 25:
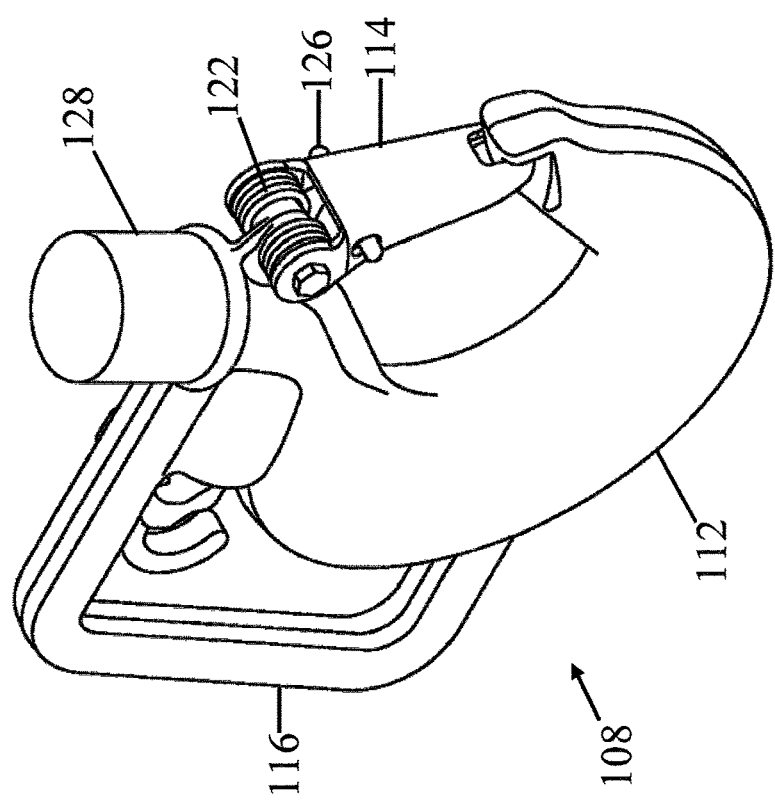

FIGS. 21 through 26 illustrate a fifth preferred embodiment of a hook with latch and trigger assembly 108. FIG. 21 illustrates a side view of the assembly 108 with a latch 114 in a closed position. FIG. 22 illustrates a sectional view of the assembly 108 shown in FIG. 21. FIG. 23 illustrates a side view of the assembly 108 with the latch 114 in an open position, while FIG. 26 illustrates a perspective view of the assembly 108 as shown in FIG. 23 with the latch 114 in the open position. FIGS. 24 and 25 illustrate alternate perspective views of the assembly 108 which includes a body 112 and a saddle 110 for receipt of a load or rigging for a load (not shown).

The latch 114 rotates about a pivot pin 124 to permit movement of the latch 114 between a closed position shown in FIGS. 21 and 22 and an open position shown in FIGS. 23 and 26.

A finger handle 116 extends from and is integral with the body 112. A retractable trigger 118 is located entirely within a space formed by the body 112 and the finger handle 116. The trigger 118 is connected to one end of an activating pin 120 visible in FIG. 22. The opposed end of the activating pin 120 is pivotally connected to the latch 114 at pivot 126. A spring 122 urges the latch 114 to the closed position.

When the finger trigger 118 is retracted, the activating pin 120 is likewise retracted (overcoming the force of the spring), causing the latch 114 to open.

A shank 128 may terminate in an eye, clevis or other termination (not shown) in order to connect with other connectors or lifting equipment.

The various embodiments provide a hook assembly with a trigger mechanism to move the latch while the operator's finger remains in the space between the finger handle and the body.

Whereas, the present invention has been described in relation to the drawings attached hereto, it should be understood that other and further modifications, apart from those shown or suggested herein, may be made within the spirit and scope of this invention.

What is claimed is:

1. A hook with locking latch and trigger mechanism assembly, which assembly comprises:
   a hook having a body and an open saddle;
   a latch pivotable between a closed position and an open position;
   a finger handle extending from said body;
   a finger trigger within a space formed between said finger handle and said body, said trigger movable between a rest position and a retracted position permitting movement of said latch to said open position; and
   an elongated activating pin attached to said finger trigger, wherein said latch includes a recess and said activating pin activates a wedge lock to engage said recess in said latch and wherein said wedge lock is pivotally attached to said hook body with a pivot pin.

2. A hook with latch and trigger mechanism assembly as set forth in claim 1 including a tension spring urging a wedge lock toward said closed position.

* * * * *